United States Patent [19]
Dillard et al.

[11] Patent Number: 6,095,620
[45] Date of Patent: Aug. 1, 2000

[54] ABS PUMP MOTOR MODULATION

[75] Inventors: Brian K. Dillard, Royal Oak; Wei Zhan, Farmington Hills, both of Mich.

[73] Assignee: Kelsey Hayes Company, Livonia, Mich.

[21] Appl. No.: 09/045,092

[22] Filed: Mar. 20, 1998

Related U.S. Application Data

[60] Provisional application No. 60/041,125, Mar. 20, 1997.

[51] Int. Cl.[7] ........................................... B60T 13/18
[52] U.S. Cl. ..................... 303/11; 303/116.1; 303/116.4
[58] Field of Search ................................ 303/138, 116.4, 303/11, 122.09, 122.12, 122.1, 116.1

[56] References Cited

U.S. PATENT DOCUMENTS

| | | | |
|---|---|---|---|
| 4,826,255 | 5/1989 | Volz | 303/10 |
| 4,893,067 | 1/1990 | Bhagwat et al. | 388/817 |
| 5,152,585 | 10/1992 | Patient et al. | 303/10 |
| 5,188,440 | 2/1993 | Muller et al. | 303/116.2 |
| 5,281,014 | 1/1994 | Volz | 303/116.1 |
| 5,410,229 | 4/1995 | Sebastian et al. | 318/434 |
| 5,454,632 | 10/1995 | Burgdorf et al. | 303/115.4 |
| 5,487,593 | 1/1996 | Potts et al. | 303/11 |
| 5,547,265 | 8/1996 | Harris et al. | 303/116.4 |
| 5,811,947 | 9/1998 | Hurst et al. | 303/122.07 |

FOREIGN PATENT DOCUMENTS

| | | |
|---|---|---|
| 3241039 A1 | 5/1984 | Germany . |
| 4229691 A1 | 3/1994 | Germany . |
| WO 92/17355 | 10/1992 | WIPO . |
| WO 94/07717 | 4/1994 | WIPO . |

*Primary Examiner*—Robert J. Oberleitner
*Assistant Examiner*—Mariano Sy
*Attorney, Agent, or Firm*—MacMillan, Sobanski & Todd, LLC

[57] ABSTRACT

A subroutine for modulating the voltage applied to power an anti-lock brake system pump motor when the vehicle speed is below a predetermined speed threshold. The voltage also is modulated when the vehicle deceleration is less than a predetermined deceleration threshold. The modulated voltage can have a constant duty cycle with a variable frequency or a constant frequency with a variable duty cycle.

21 Claims, 14 Drawing Sheets

PERCENT ON = 0.25

PERCENT ON = 0.50

PERCENT ON = 0.75

ABS PUMP MOTOR MODULATION

CROSS REFERENCE TO RELATED APPLICATION

This application claims the benefit of U.S. Provisional Application No. 60/041,125, filed Mar. 20, 1997.

BACKGROUND OF THE INVENTION

This invention relates in general to Anti-lock Brake Systems and in particular to modulation of the voltage supply for an Anti-lock Brake System pump motor.

An Anti-lock Brake System (ABS) is often included as standard equipment on new vehicles. When actuated, the ABS is operative to modulate the pressure applied to some or all of the vehicle wheel brakes. A typical ABS includes a plurality of solenoid valves mounted within a control valve body and connected to the vehicle hydraulic brake system. The valve body also includes an accumulator for the temporary storage of brake fluid during an anti-lock braking cycle.

A separate hydraulic source, such as a motor driven pump, is usually included in the ABS for reapplying hydraulic pressure to the controlled wheels during an ABS braking cycle. Alternately, the pump can return brake fluid from the accumulator to the vehicle master brake cylinder during an ABS braking cycle. The pump is typically included within the control valve body while the pump motor is mounted upon the exterior of the control valve body. The pump motor is usually a direct current motor which operates from the vehicle power supply. Typically, the motor runs continuously during an ABS braking cycle.

An ABS further includes an electronic control module which has a microprocessor. The microprocessor is electrically connected to the pump motor, a plurality of solenoid coils associated with the solenoid valves, and wheel speed sensors for monitoring the speed and deceleration of the controlled wheels. The assembled valve body, motor and control module form a compact unit which is often referred to as an ABS control valve.

During vehicle operation, the microprocessor in the ABS control module continuously receives speed signals from the wheel speed sensors. The microprocessor monitors the speed signals for potential wheel lock-up conditions. When the vehicle brakes are applied and the microprocessor senses an impending wheel lock-up condition, the microprocessor is operative to initiate an ABS braking cycle. During the ABS braking cycle, the microprocessor actuates the pump motor and selectively operates the solenoid valves in the control valve to cyclically relieve and reapply hydraulic pressure to the controlled wheel brakes. The hydraulic pressure applied to the controlled brakes is adjusted by the operation of the solenoid valves to limit wheel slippage to a safe level while continuing to produce adequate brake torque to decelerate the vehicle as desired by the vehicle operator.

The microprocessor includes a memory portion which stores an ABS control program. The control program comprises a set of instructions for the microprocessor which control the operation of the ABS. Typically, the instructions include a set of operational checks which are run during vehicle start up to assure that the ABS is functional. The control program also includes subroutines for monitoring the vehicle operation to detect a potential lock-up of the controlled wheel brakes and for the actual operation of the ABS during an anti-lock braking cycle.

SUMMARY OF THE INVENTION

This invention relates to modulation of the voltage supplied to an Anti-lock Brake System pump motor to reduce motor noise.

An ABS is typically equipped with a constant speed pump motor. During operation of the ABS, the pump motor is actuated and generates some noise during operation. Usually, the pump motor noise is masked by other vehicle sounds. However, when the vehicle operates upon a low mu road surface, the ABS can be operative to modify the ABS response to a potential brake lock-up to compensate for the low mu surface. When such a situation occurs, the demand upon the pump is reduced; however, because the pump motor operates at one speed, the sound of the pump motor may seem loud to the vehicle operator. Similarly, during the final portion of a stopping cycle, the ABS demand upon the pump is again reduced but the pump speed remains constant. As the vehicle slows to a stop, the pump motor sound will become more apparent and may be objectionable to the vehicle operator. Thus, it would be desirable to reduce the pump motor noise.

The present invention contemplates reducing the pump motor noise by modulating the voltage supplied to the pump motor to reduce the motor speed. Either frequency or pulse width modulation can be used. Accordingly, the present invention contemplates a control module for a vehicle brake control system. The control system is operable to control the pressure of the brake fluid applied to at least one vehicle wheel brake and includes a motor driven pump for supplying pressurized brake fluid to the vehicle brake system. The control module includes a control device adapted to supply power to the pump motor and a vehicle speed sensor which is coupled to the control device. The control device is responsive to a speed signal generated by the speed sensor being less than a predetermined vehicle speed threshold to modulate the power supplied to the pump motor. Additionally, the control device can calculate a vehicle deceleration. If the vehicle deceleration is less than a predetermined deceleration threshold, the control device is operative to modulate the power supplied to the pump motor. Alternately, the invention contemplates that the control device can be directly actuated when the vehicle deceleration is less than the predetermined deceleration threshold. The control device can be included in an anti-lock brake system or a traction control system.

In the preferred embodiment, the control device includes a switching device adapted to be connected between a power supply and the pump motor. The switching device has a first conducting state and a second non-conducting state with the control device being operable to switch the switching device between the first and second states to modulate the power supplied to the pump motor. Also in the preferred embodiment, the power supply is modulated by switching the motor voltage between zero and the power supply voltage. The modulated voltage can have either a constant duty cycle and an adjustable frequency or a constant frequency and an adjustable duty cycle.

The present invention also contemplates a method for controlling at least one vehicle wheel brake comprising the steps of providing a control module for a vehicle brake control system which is operable to control the pressure of the brake fluid applied to at least one vehicle wheel brake. The control system has a control module and a motor driven pump for supplying pressurized brake fluid to the brake system. The control module includes a control device for supplying power to the pump motor and a vehicle speed sensor coupled to the control module. The speed sensor generates a speed signal. The control device monitors the vehicle speed signal and modulates the power supplied to the pump motor when the vehicle speed is less than a vehicle speed threshold. Additionally the control device can calculate the vehicle deceleration and modulate the power supplied to the pump motor when the vehicle deceleration is less than a deceleration threshold.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1A:
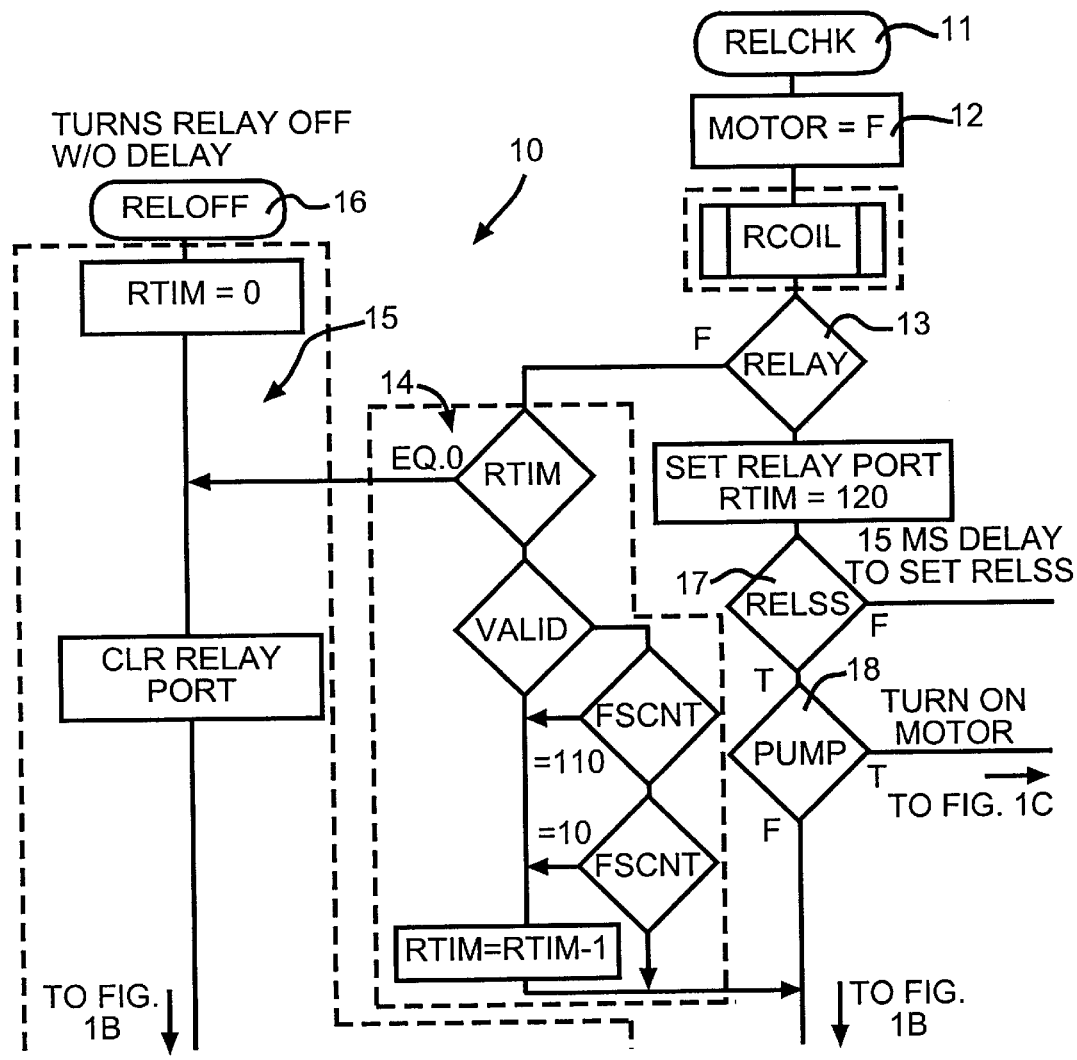
FIG. 1 is a flow chart for a pump motor management subroutine for controlling the voltage applied to an ABS pump motor in accordance with the invention.
Figure 1B:
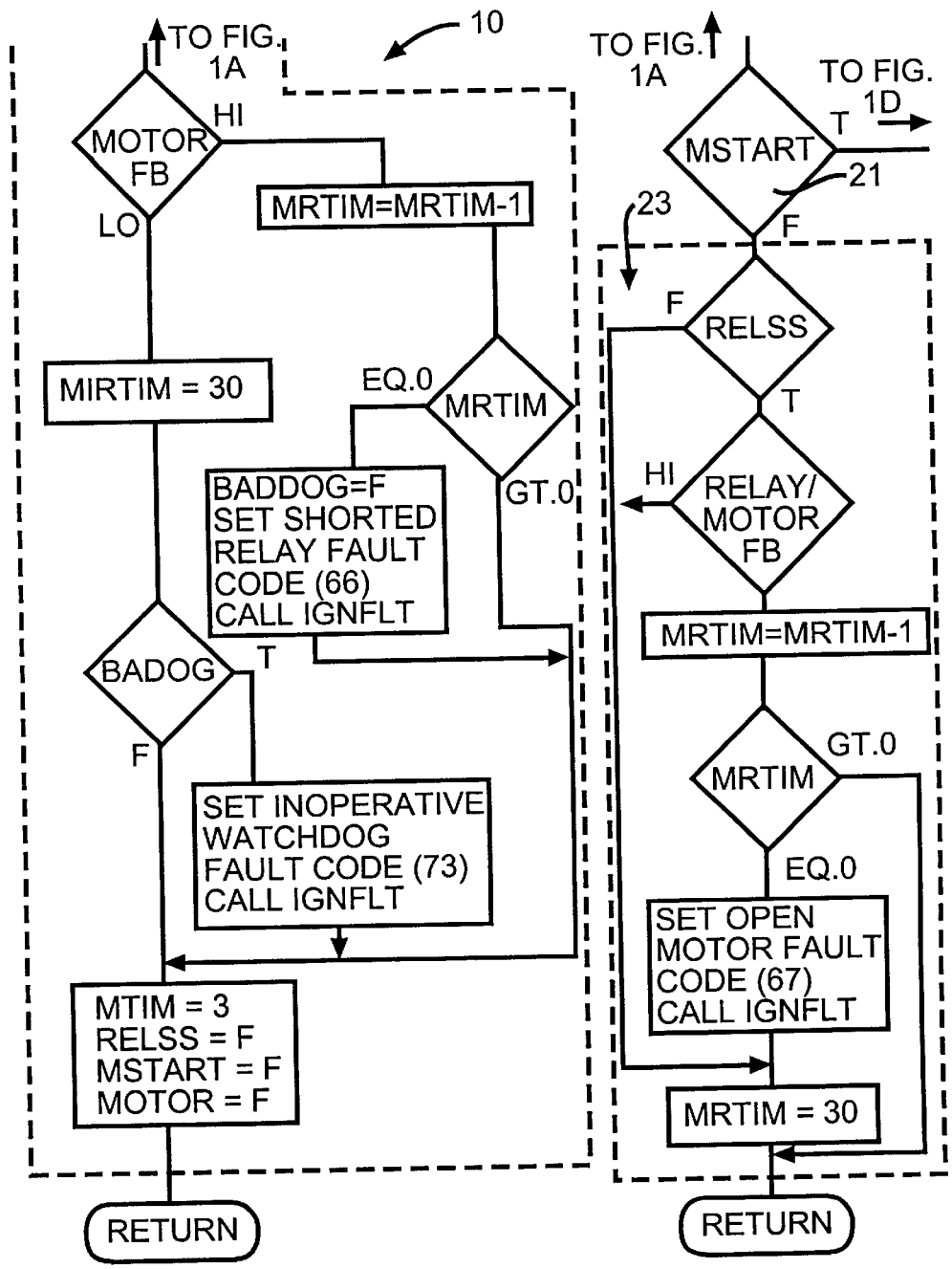
Figure 1C:
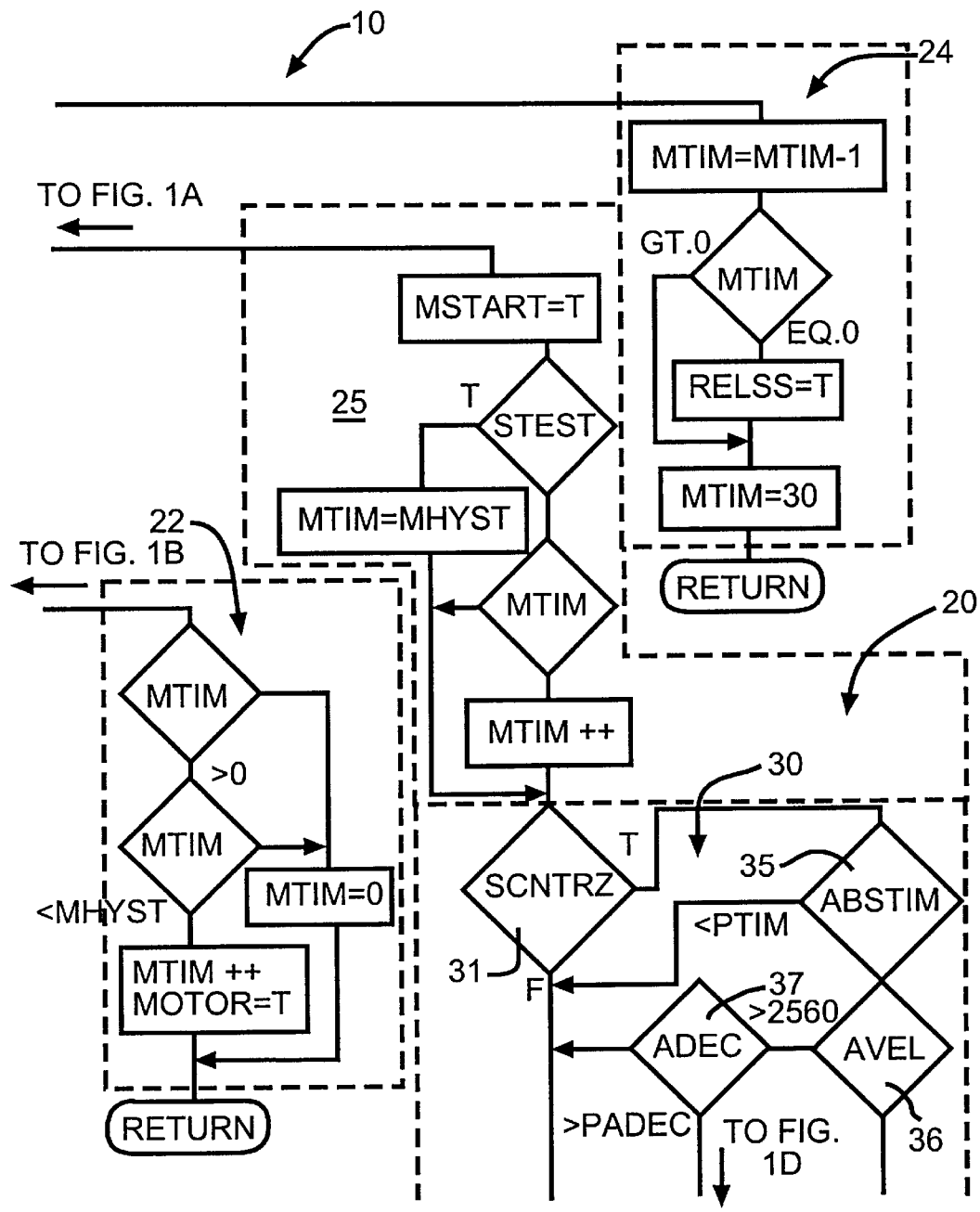
Figure 1D:
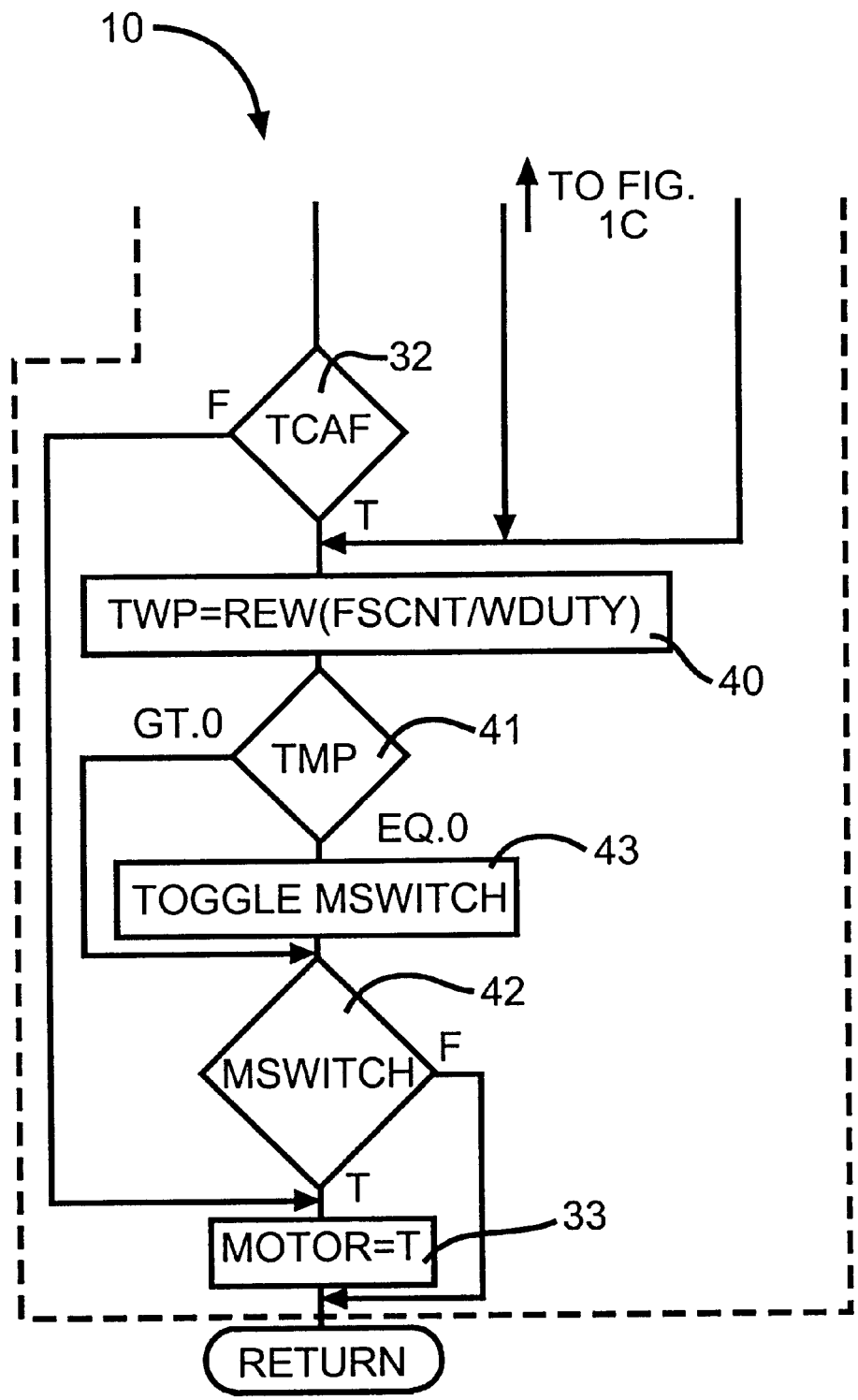

Referring now to the figures, there is shown in FIG. 1, a flow chart for a relay and pump motor management subroutine 10 which is included in an improved ABS control program. The motor management subroutine 10 includes a number of subroutines for operating an ABS pump motor (not shown). There are two entrances into the management subroutine 10 from the main portion of the control program. The first entrance is a Relay check entrance block, which is labeled "RELCHK" and identified by the numeral 11 in the flow chart shown in FIG. 1. The RELCHK entrance block 11 is the entrance to the main portion of the relay and motor management subroutine 10.

The relay referenced by the RELCHK entrance block 11 is a device which controls the power supplied to the ABS components, which include the pump motor and solenoid coils for the valves. The relay can be a mechanical or solid state switch. Typically, the relay is the later, such as a Field Effect Transistor (FET) which is controlled by the ABS control module microprocessor in accordance with the ABS control program. The gate of the FET is connected through a driver circuit to a relay control port on the microprocessor. The microprocessor is responsive to the ABS control program to switch the voltage at the microprocessor port between a high value, which in the preferred embodiment is five volts, and a low value, which in the preferred embodiment is ground. The FET driver is, in turn, responsive to the gate voltage to apply a voltage to the FET gate or to connect the FET gate to ground which causes the FET to switch between its conducting and non-conducting states.

When the relay is ON, i.e., in a closed or conducting state, power is available, under the control of other electronic switches, such as additional FET's, to supply the pump motor and solenoid coils. Likewise, when the relay is OFF, i.e., in an open or non-conducting state, the flow of current to the ABS components is blocked and the pump motor is off. In the preferred embodiment, each iteration of the main ABS control program accesses the RELCHK entrance block 11.

The relay and motor management subroutine 10 includes several imbedded subroutines. Before reaching any of the embedded subroutines, the MOTOR request flag is set to FALSE in functional block 12. Upon returning to the main portion of the control program, the MOTOR request flag is checked. The microprocessor is responsive to the condition of the MOTOR request flag to provide power to the pump motor when the MOTOR flag is TRUE and to block power from the pump motor when the MOTOR request flag is FALSE.

The subroutine 10 then transfers to relay decision block 13 which checks the condition of a RELAY flag. If the RELAY flag is set FALSE, the subroutine 10 transfers to an embedded spin down subroutine 14 which allows the motor extra time to spin down following an ABS system check. In the preferred embodiment, an ABS system check is initiated when the vehicle ignition is energized or the vehicle accelerates through four miles per hour. Upon completion of the ABS system check, control returns to the main portion of the ABS control program. Upon subsequent transfers to the spin down subroutine 14, the subroutine 10 further transfers to an embedded relay off subroutine labeled 15. Upon entering the relay off subroutine 15, the ABS microprocessor will follow the instructions contained therein to immediately open the relay by clearing the relay control port on the microprocessor. Upon completion of the relay off subroutine 15, control is returned to the main portion of the ABS control program.

The relay off subroutine 15 also can be entered directly from the main portion of the motor management subroutine 10 when the relay flag is set FALSE. The direct access is through a second entrance block 16 which is "RELOFF" in FIG. 1. The main ABS control program transfers directly to the RELOFF entrance block 16 upon detecting that the RELAY flag has been set FALSE.

If the relay flag is true in decision block 13, the subroutine 10 transfers to another decision block 17 to check a RELay Steady State (RELSS) flag. If both the RELAY and RELSS flags are set TRUE, control is transferred to a PUMP decision block 18 where a pump flag is checked. If the pump flag has been set, or is TRUE, the program branches to an embedded motor run subroutine 20, which will be described below. If the pump flag is not set, or is FALSE, the program branches through a Motor START (MSTART) decision block 21 to either an embedded motor shut off delay subroutine 22 or an embedded open motor circuit detection subroutine 23. Following completion of the steps included in the selected subroutine, 22 or 23, control reverts to the main portion of the ABS control program.

If the RELAY flag is TRUE, but the RELSS flag is FALSE, the subroutine 10 transfers to an embedded time delay subroutine 24 which delays starting the pump motor for a predetermined time before the RELSS flag is set. The time delay assures that the relay has closed to supply power to the ABS components. In the preferred embodiment, the delay is 15 msec. Once the delay expires, the RELSS flag is set TRUE, allowing the management subroutine 10 to advance to the PUMP decision block 18.

As described above, if the PUMP flag is TRUE in the PUMP decision block 18, the subroutine transfers to the embedded motor run subroutine 20. A first portion of the motor run subroutine 20 includes a motor hysterisis loop subroutine 25 which provides a predetermined period of time for the pump motor to accelerate to operating speed. Before entering the hysterisis loop subroutine 25, the MSTART flag is set TRUE.

The present invention is directed to a motor voltage modulation subroutine 30 which is embedded within the motor run subroutine 20. After leaving the motor hysterisis loop subroutine 25, the pump motor management subroutine 10 enters the modulation subroutine 30. Upon entering the modulation subroutine 30, a System CoNTRol 2 (SCNTR2) flag is checked in decision block 31 to determine if the ABS has been activated. If the SCNTR2 flag is set, or TRUE, an anti-lock brake cycle is in progress and the subroutine 30 advances to check vehicle speed and deceleration, as will be described below. If the SCNTR2 flag is not set, or FALSE, the ABS has not been activated and the modulation subroutine 30 advances to decision block 32 to check a Traction Control Active Flag (TCAF). If the TCAF flag is set, or TRUE, the vehicle traction control is actuated and the subroutine 30 advances to modulate the motor voltage, as will be described below. If the TCAF flag is not set, or FALSE, the subroutine 30 advances to functional block 33 where the MOTOR request flag is set to TRUE. The subroutine 30 then returns to the main portion of the ABS control program. The microprocessor is responsive to the MOTOR request flag being set TRUE to provide power to the pump motor.

As described above, a TRUE SCNTR2 flag will implement further checks. First the ABS TIMer (ABSTIM) is checked in an ABSTIM decision block 35 for the totaled elapsed time, in number of completed iterations through the program, that the ABS has been active. If the ABSTIM is less than a predetermined period of time (PTIM) the ABS is still in the first portion of an anti-lock braking cycle and full pump output is desired. Accordingly, the subroutine transfers to the TCAF decision block 32 and unmodulated power is supplied to the pump motor. In the preferred embodiment, PTIM is equal to 400 iterations, which corresponds to two seconds. The delay provided by PTIM allows accumulation of sufficient data to calculate an estimated vehicle deceleration. Additionally, the delay allows the initial motor starting current surge to decay, reducing motor power demands on the motor switching FET.

If ABSTIM is greater than or equal to PTIM, the program advances to a vehicle velocity decision block 36 where an estimated vehicle velocity is compared to a predetermined vehicle speed threshold. If the estimated vehicle velocity is less than or equal to the speed threshold, which, in the preferred embodiment is ten miles per hour, the program branches to a pump motor voltage modulation portion of the subroutine 30, which will be described below. Thus, in the preferred embodiment, the pump motor voltage is modulated when the vehicle speed is less than ten miles per hour, which corresponds to the end portion of an anti-lock braking cycle.

If the estimated vehicle velocity is greater than the threshold vehicle speed, the modulation subroutine 30 transfers to a vehicle deceleration decision block 37. The vehicle deceleration is proportional to the mu of the road surface and a low deceleration is indicative of the vehicle operating upon a low mu surface. In decision block 37, an estimated vehicle deceleration is compared to a predetermined deceleration threshold, PADEC. In the preferred embodiment, PADEC is equal to 620, which corresponds to 0.35 g. If the estimated vehicle deceleration is less than or equal to PADEC, the subroutine branches to the pump motor modulation portion of the subroutine 30. If the vehicle deceleration is greater than PADEC, the subroutine transfers to the TCAF decision block 32.

The motor modulation portion of the subroutine 30 is entered through functional block 40 where a variable TMP is calculated and stored in a temporary storage register. The variable is defined by the following formula:

$$TMP = REM(FSCNT/MDUTY)$$

Where REM is the remainder obtained from the operation shown within the parenthesis;

FSCNT is the value of a system counter which is continuously cycled through a 200 to one countdown; and MDUTY is an integer which, in the preferred embodiment, has a value selected from the range of one to ten.

The remainder will be either zero or non-zero for each iteration of the subroutine. For example, when MDUTY is two, all even counts of FSCNT are evenly divisible by two and the remainder will be zero. However, all uneven counts of FSCNT are not evenly divisible by two and a non-zero remainder will result.

The content of the temporary register is checked in a TMP decision block 41. If the temporary register content is non-zero, the subroutine transfers to a Motor SWITCH (MSWITCH) decision block 42. If the temporary register content is zero, the subroutine transfers to toggle a Motor SWITCH (MSWITCH) flag in functional block 43. The toggle in functional block 43 changes the state of the MSWITCH flag. Thus, if the MSWITCH flag is TRUE upon entering the functional block 43, the MSWITCH flag is reset to FALSE. Similarly, if the MSWITCH flag is FALSE upon entering the functional block 43, the MSWITCH flag is reset to TRUE. The subroutine then proceeds to the MSWITCH decision block 42.

If the MSWITCH is TRUE, the subroutine moves to functional block 33 and the MOTOR request flag is set true and power is delivered to the pump motor. If the MSWITCH is FALSE, the subroutine 30 skips functional block 33 and returns to the main portion of the ABS control program with the MOTOR request flag remaining FALSE, as set in functional block 12. As described above, a FALSE MOTOR request flag causes the microprocessor to block the power to the pump motor. Thus, the motor modulation subroutine 30 is operative to frequency modulate the voltage applied to the pump motor. The modulated voltage has a 50 percent duty cycle. The frequency of the modulated voltage is a function of the microprocessor clock speed and MDUTY. For values of MDUTY ranging from one to five, the relationship between and MDUTY and the motor voltage frequency is illustrated in the following table:

| MDUTY | Motor Voltage Frequency |
|---|---|
| 1 | 100 Hz |
| 2 | 50 Hz |
| 3 | 33 Hz |
| 4 | 25 Hz |
| 5 | 20 Hz |

Figure 2:
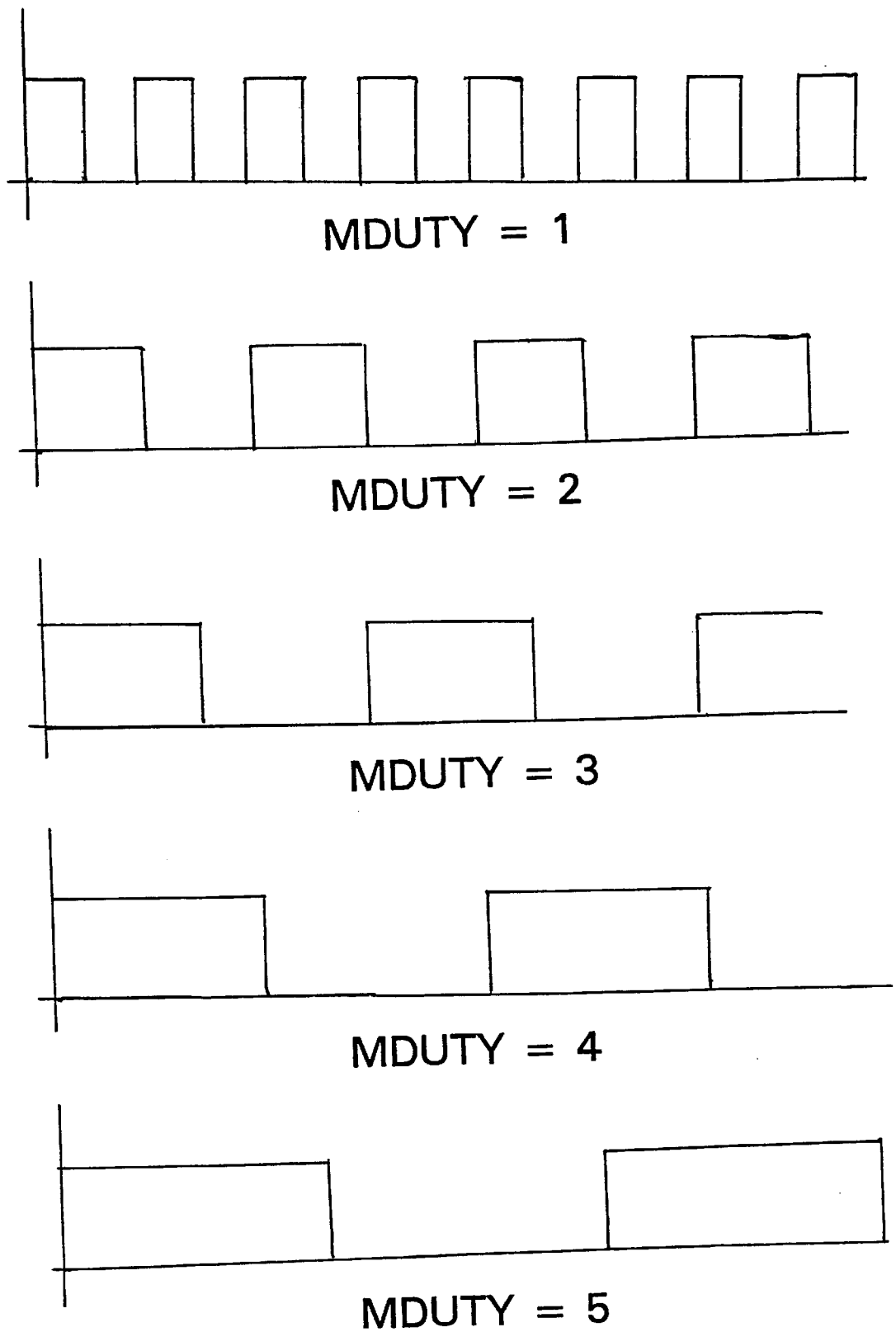
FIG. 2 illustrates the pump voltage generated under the control of the subroutine shown in FIG. 1.
Figure 3A:
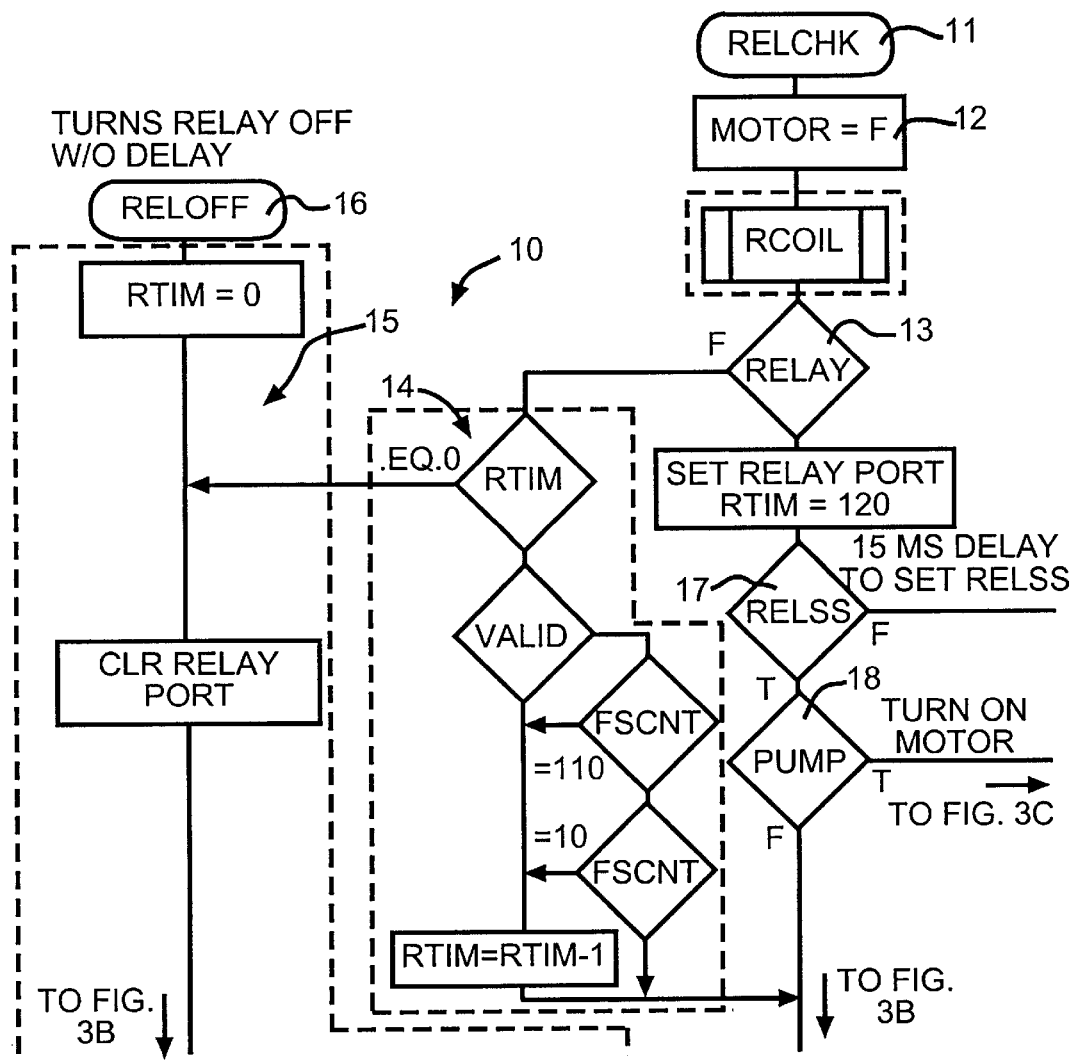
FIG. 3 is an alternate embodiment of the flow chart shown in FIG. 1.
Figure 3B:
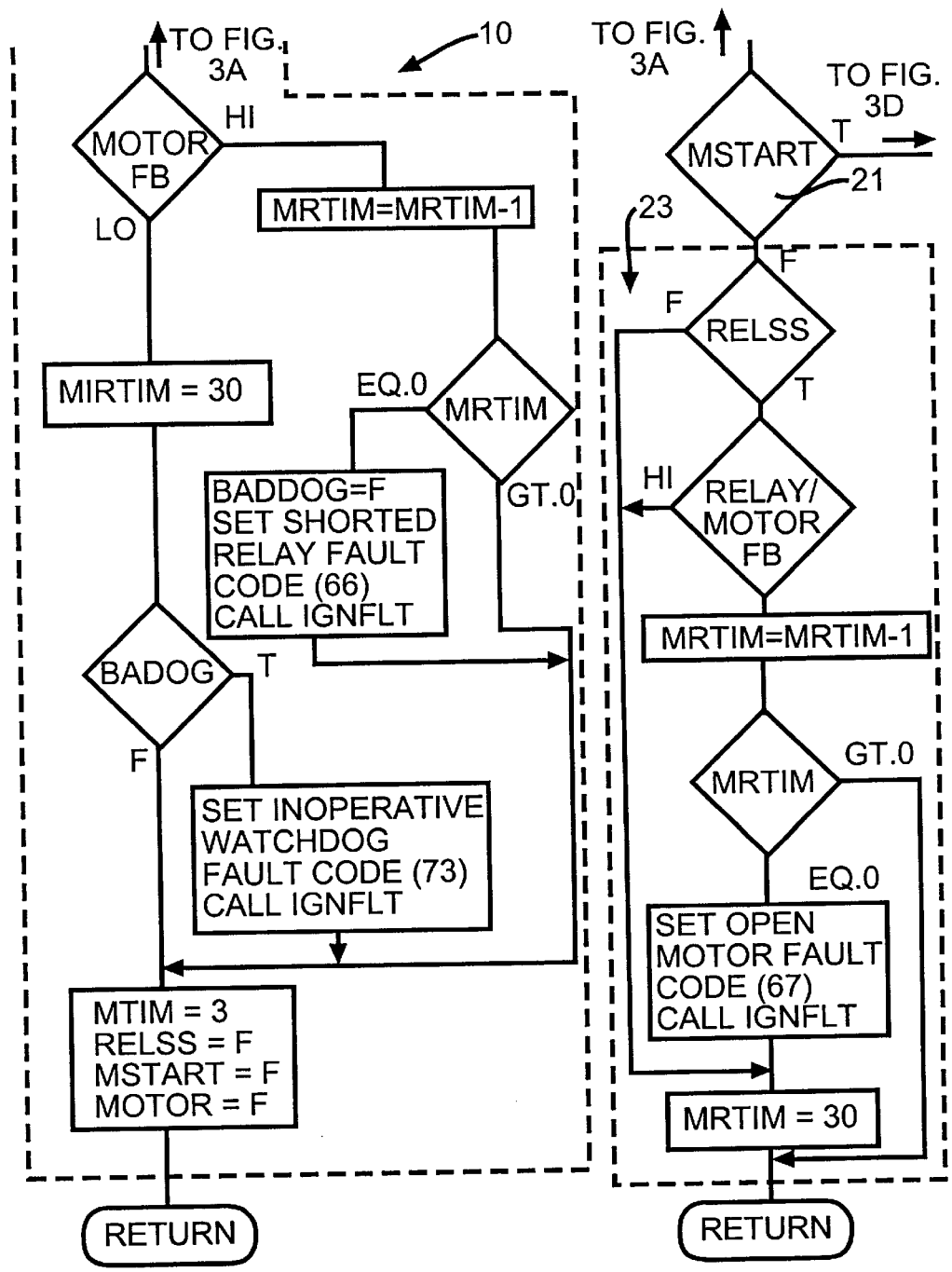
Figure 3C:
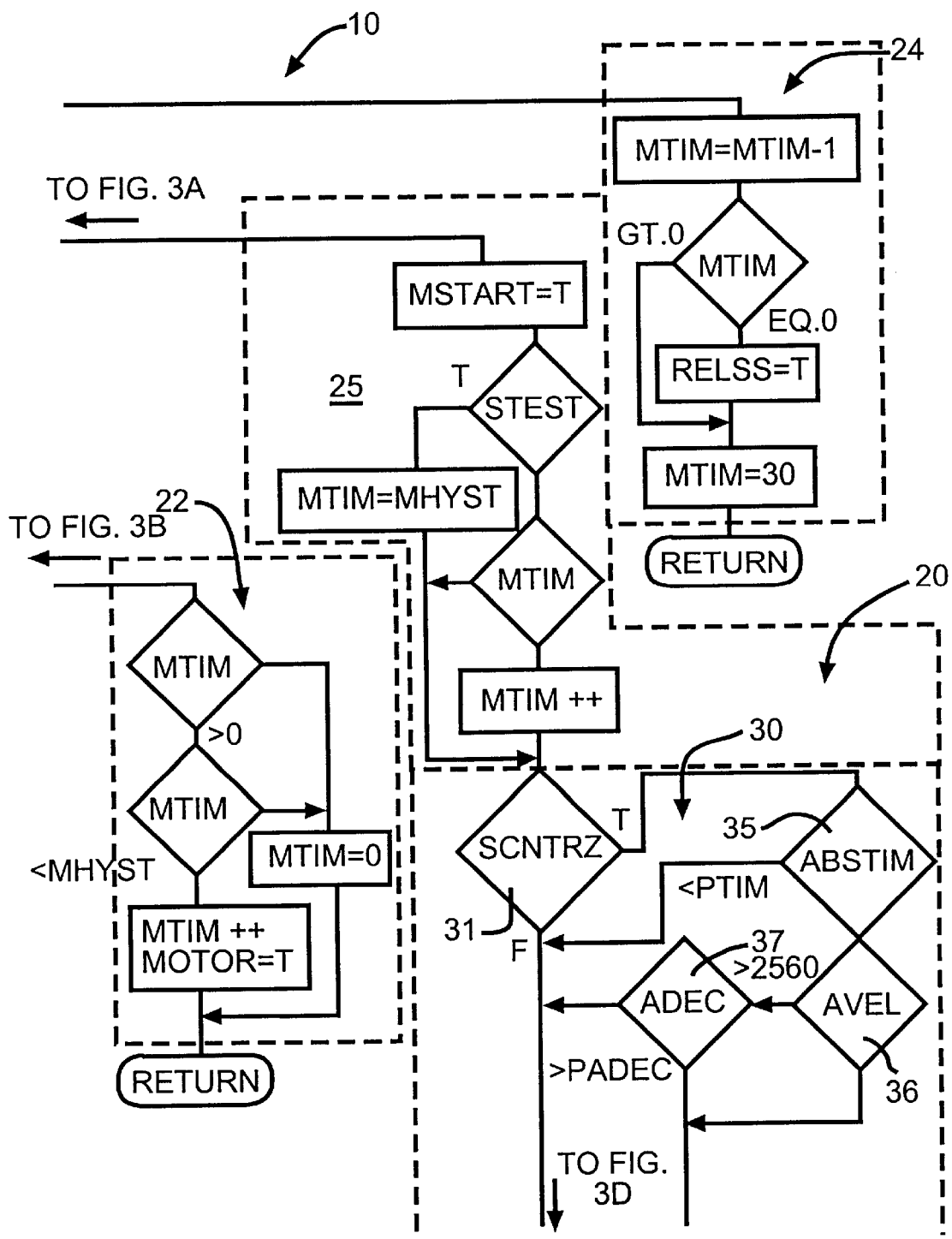
Figure 3D:
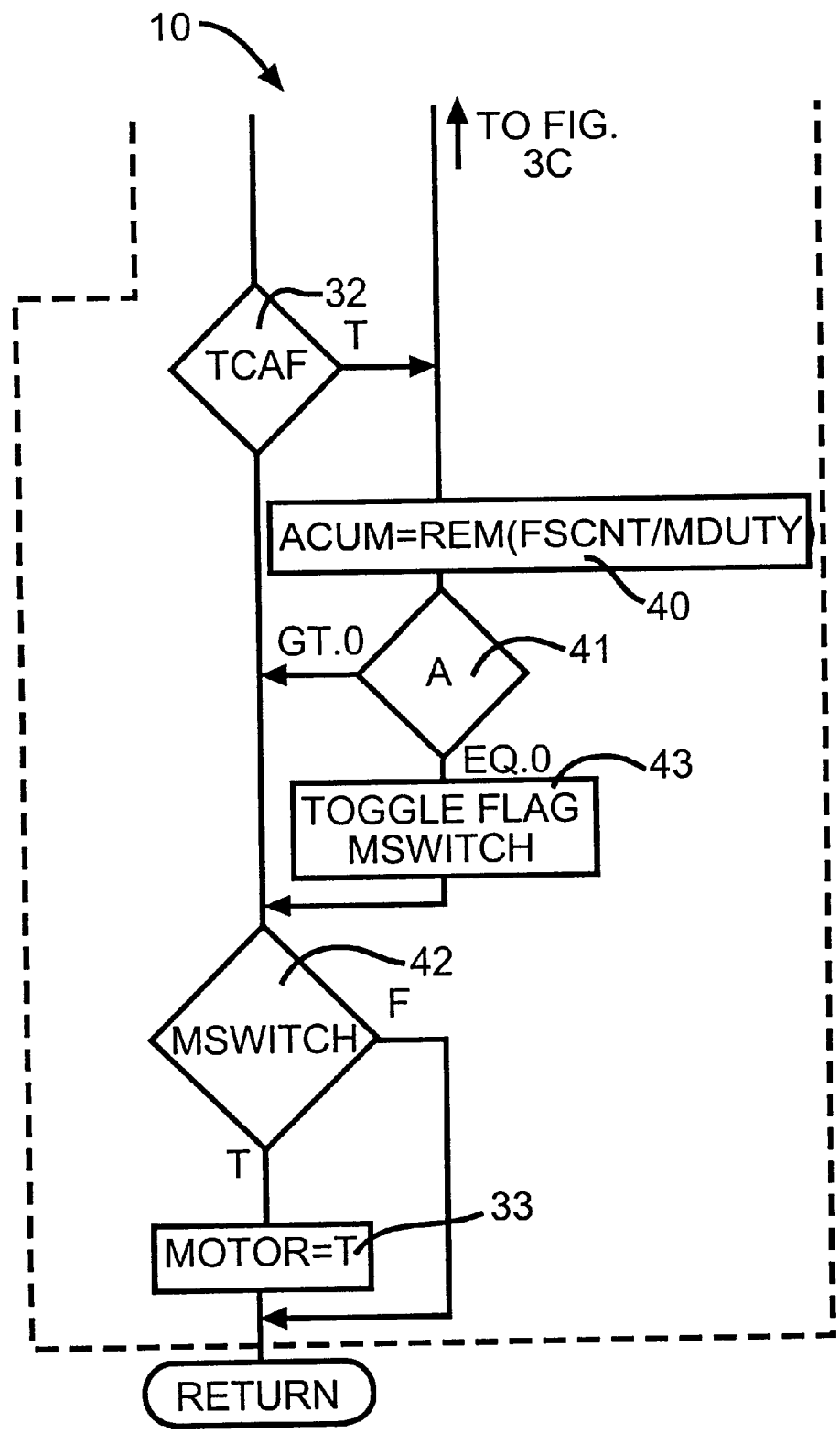

Thus, as MDUTY increases, the frequency and thereby the pump motor speed decrease. The resulting voltage waveforms are illustrated in FIG. 2. In the preferred embodiment, MDUTY is selected to correspond to the particular vehicle platform. Thus, the same control module can be installed on a variety of vehicle platforms. Alternately, MDUTY can be selected by the microprocessor in accordance with the values of specified vehicle operating parameters. It will be appreciated that other frequencies can be achieved by varying the microprocessor clock speed or using other values for MDUTY.

The modulation of the pump motor voltage can be disabled for an anti-lock braking cycle by setting PTIM to a value which exceeds the maximum amount of time required to stop the vehicle. In the preferred embodiment, the modulation is disabled by setting PTIM equal to 24,000, which corresponds to a two minute delay. Alternately, the modulation can be disabled by setting PADEC to zero. While the modulation of the pump motor voltage is disabled for anti-lock brake operations, the modulation is still operational for traction control.

The present invention also contemplates an alternate embodiment of the subroutine 30 for vehicles which are not equipped with traction control (not shown). The alternate embodiment omits the TCAF decision block 32 from the subroutine 30 shown in FIG. 1. With the TCAF decision block 32 deleted, the subroutine can transfer directly to the MOTOR decision block 33 from the SCNTR2, ABSTIM and ADEC decision blocks, which are, respectively, 31, 35 and 37.

An alternate embodiment 50 of the motor voltage modulation subroutine is illustrated in the flow chart shown in FIG. 3. In FIG. 3, the other embedded subroutines of the motor management subroutine 10 which are the same as are shown in FIG. 1 are labeled with the same numerical designators. Similarly, the operations included in the modulation subroutine 50 which are the same as operations included in the modulation subroutine 30 described above, also are labeled with the same numerical designators.

As shown in FIG. 3, all control in the modulation subroutine 50 is transferred to the MSWITCH flag decision block 42. Accordingly, the MSWITCH flag is checked during every iteration of modulation subroutine 50. This is different from the above described modulation subroutine 30 where a FALSE indication for TCAF transfers the subroutine directly to the functional block 33 to set the MOTOR flag TRUE. The pump motor modulation subroutine 50 is operative to cause the microprocessor to frequency modulate the voltage applied to the pump motor. The modulated voltage has a constant duty cycle of 50 percent.

The present invention also contemplates an alternate embodiment of the subroutine 50 for vehicles which are not equipped with traction control (not shown). The alternate embodiment omits the TCAF decision block 32 from the subroutine 50 shown in FIG. 3. With the TCAF decision block 32 deleted, the subroutine can transfer directly to the MSWITCH decision block 42 from the SCNTR2, ABSTIM and ADEC decision blocks, which are, respectively, 31, 35 and 37.

Figure 4A:
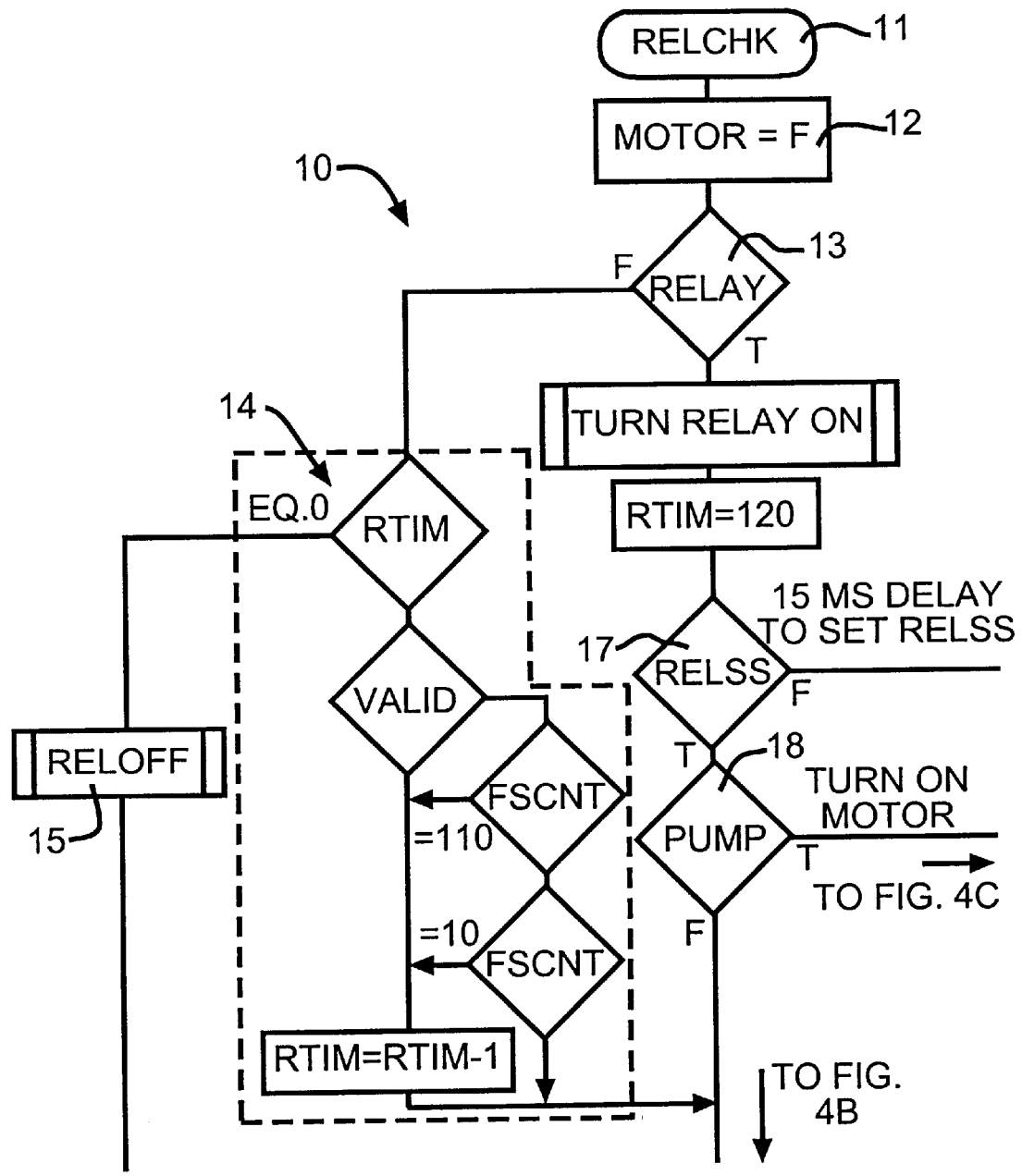
FIG. 4 is another embodiment of the flow chart shown in FIG. 1.
Figure 4B:
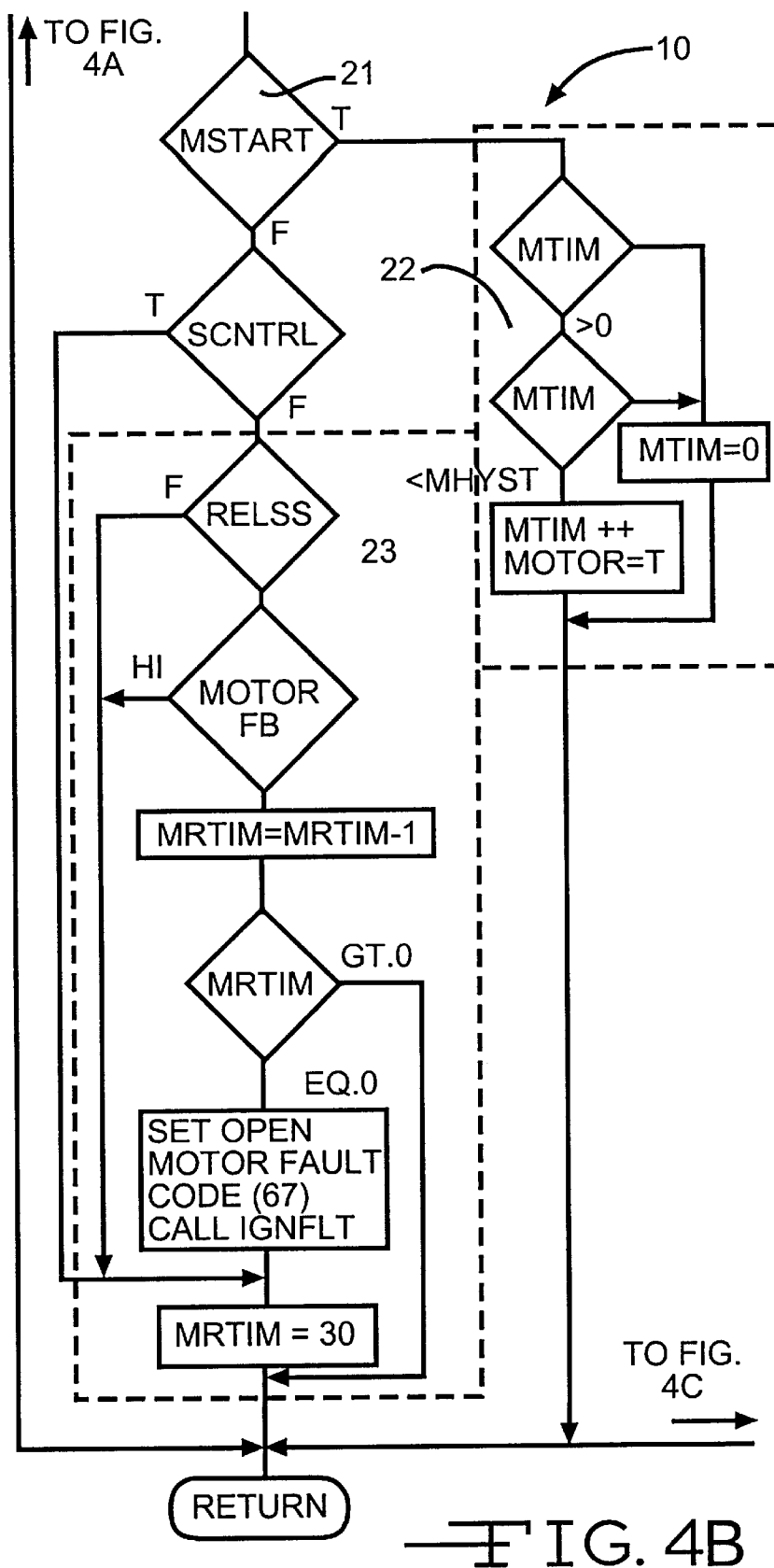
Figure 4C:
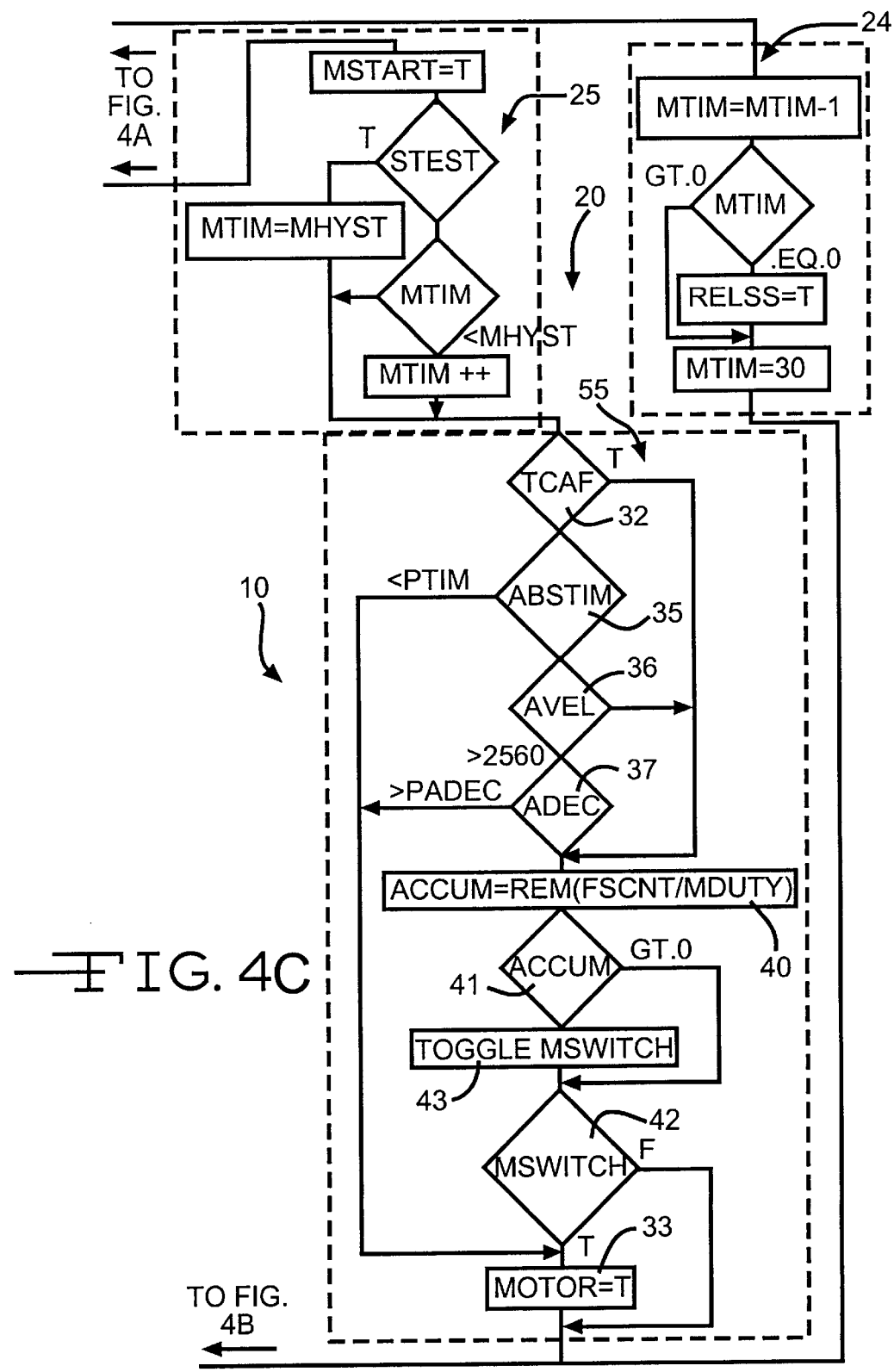

Another embodiment of the of the motor voltage modulation subroutine is shown at 55 in FIG. 4. Embedded subroutines and operations included in the modulation subroutine 55 which are the same as described above and shown in FIGS. 1 and 3 are labeled with the same numerical designators. The modulation subroutine 55 applies the same decision criteria given above for toggling MSWITCH in functional block 43. However, the initial decisions in the subroutine 55 are made sequentially. Thus, the TCAF flag is checked first in decision block 32. If the traction control is not active, the ABSTIM is checked next in decision block 35. If the time threshold has been exceeded, the estimated vehicle velocity is compared to the threshold vehicle speed in decision block 36. Finally, if the estimated vehicle velocity is equal to, or greater than, the threshold speed, the estimated vehicle deceleration is compared to the threshold deceleration in decision block 37. As a default at this point, the subroutine transfers to functional block 33 to set the MOTOR request flag TRUE. Otherwise, the subroutine 55 transfers to functional block 40 to enter a toggling portion of the subroutine 55, which is the same as described above.

Additionally, the initial step of checking the SCNTR2 flag to confirm that the ABS is active has been omitted from the subroutine 55. Similar to the subroutines described above, the pump motor modulation subroutine 55 is operative to cause the microprocessor to frequency modulate the voltage applied to the pump motor. The modulated voltage has a constant duty cycle of 50 percent.

The present invention also contemplates an alternate embodiment of the subroutine 55 for vehicles which are not equipped with traction control (not shown). The alternate embodiment omits the TCAF decision block 32 from the subroutine 55 shown in FIG. 4. With the TCAF decision block 32 deleted, the subroutine is entered through the ABSTIM decision block 35.

Figure 5:
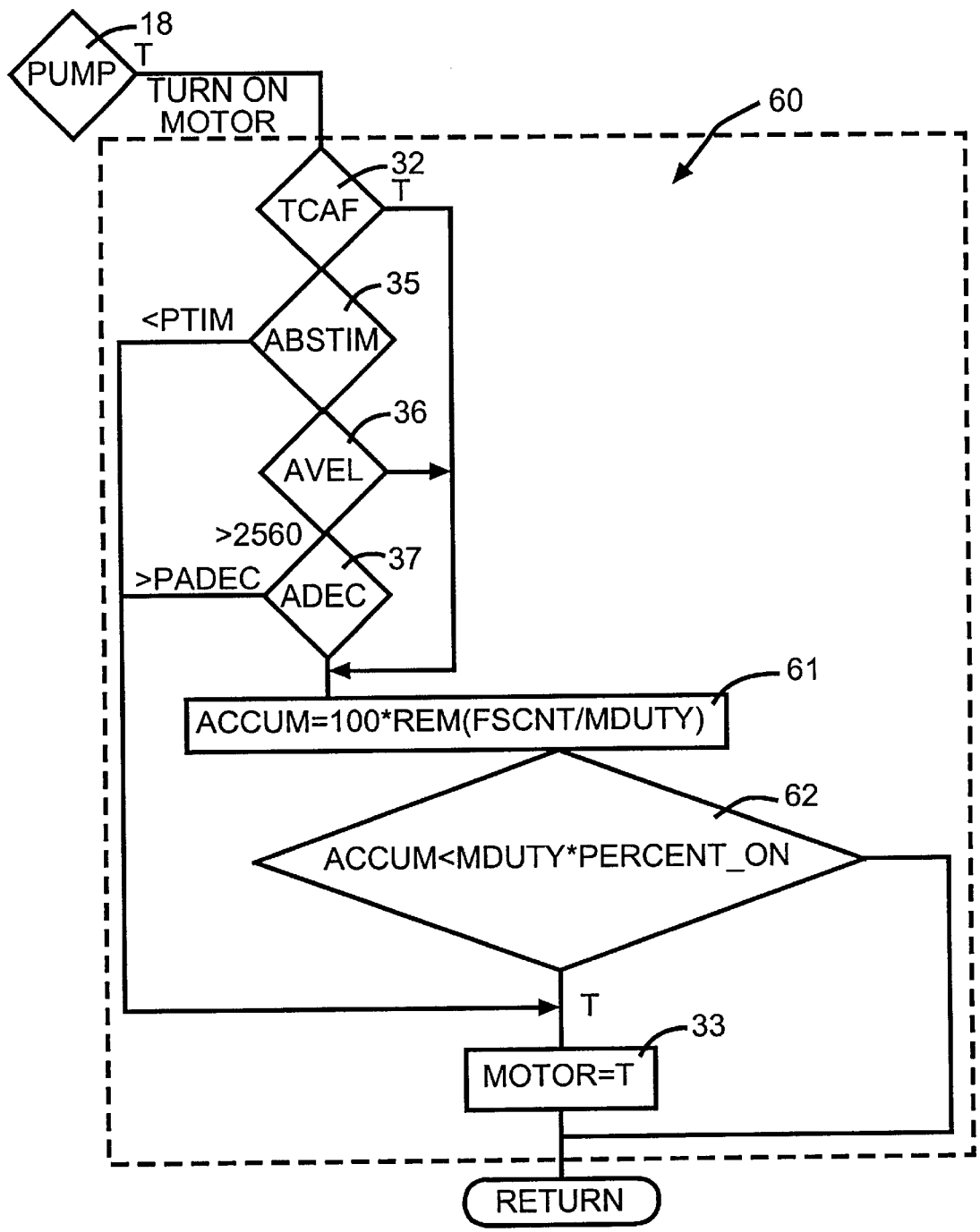
FIG. 5 is a portion of the flow chart shown in FIG. 4 which illustrates an alternate embodiment of the pump motor control.

The invention also contemplates a modulation subroutine which is shown generally at 60. The subroutine 60 causes the microprocessor to Pulse Width Modulate (PWM) the voltage applied to the pump motor. The resulting modulated voltage has a constant frequency. The PWM subroutine 60 is included in the motor management subroutine 10 described above. However, for simplicity, only the PUMP flag decision block 18 from the motor management subroutine 10 is shown in FIG. 5. Also, the motor hysterisis loop subroutine 25 has been omitted form the flow chart.

As described above, if the PUMP flag is set TRUE, the motor management subroutine 10 transfers to the PWM subroutine 60. The initial checks of TCAF, ABSTIM and the estimated vehicle velocity and deceleration are the same as shown in FIG. 4 above. If modulation is not required, the PWM subroutine 60 returns to the main portion of the ABS control program after setting the MOTOR request flag TRUE in functional block 33. However, if modulation is required, the PWM subroutine 60 advances to functional block 61 where a variable is calculated and loaded into an accumulator. The content of the accumulator after the calculation is given by the following formula:

$$ACCUM=100 * REM(FSCNT/MDUTY);$$

where the formula variables are the same as defined above.

Figure 6:
FIG. 6 illustrates the pump voltage generated under the control of the subroutine shown in FIG. 5.
Figure 6:
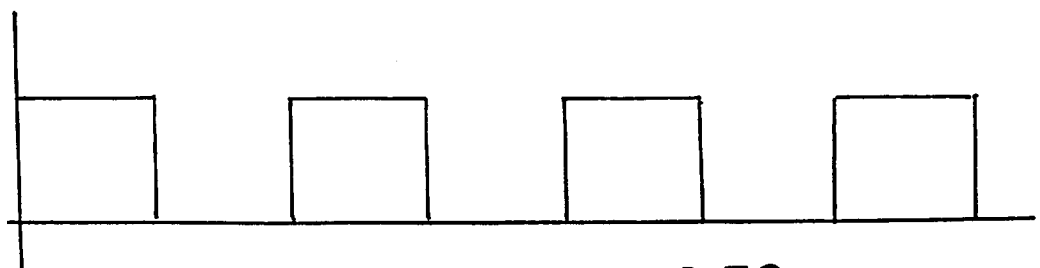
Figure 6:
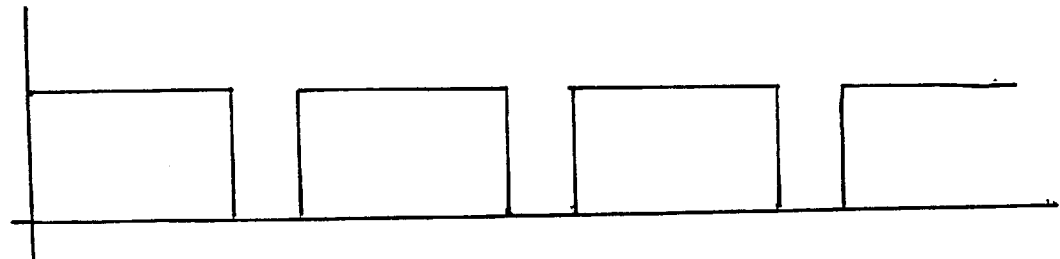

In decision block 62, the content of the accumulator is compared to the product of MDUTY, which is a variable trim constant, expressed as an integer, and PERCENT_ON, which is the desired duty cycle of the modulated pump motor voltage, expressed as a decimal. If ACCUM is less than the product, the MOTOR request flag is set TRUE in functional block 33. If ACCUM is greater than or equal to the product, the program returns to the main control program with the MOTOR request flag still set FALSE. The subroutine 60 is operable to cause the microprocessor to PWM modulate the voltage applied to the pump motor. The modulated voltage has a constant frequency. The duty cycle of the modulated voltage is determined by the value of the variable PERCENT_ON, while the frequency of the modulated voltage is a function of the microprocessor clock rate and the value of MDUTY. In the preferred embodiment, the variable PERCENT_ON is selected to correspond to the particular vehicle platform. Alternately, PERCENT_ON can be selected by the microprocessor in accordance with values of specified vehicle operating parameters. Examples of typical PWM voltages resulting from the subroutine 60 are shown in FIG. 6. As shown in FIG. 6, as the duty cycle increases, the average voltage applied to the ABS pump motor also increases, causing the pump motor to run at a higher rate of speed.

While the preferred embodiment of the PWM subroutine 60 has been illustrated and described as including traction control, it will be appreciated that the invention also can be practiced on a vehicle which is not equipped with traction control. To remove the traction control feature from the PWM subroutine 60, the TCAF decision block 32 is deleted from the subroutine 60, as described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the invention has been described and illustrated as modulating the power supplied to a pump motor valve in an anti-lock brake system, it will be appreciated that the invention can be applied to other devices, such as, for example, vehicle stability maintenance systems. Additionally, it will be appreciated that both the duty cycle and the frequency of the modulated voltage applied to the pump motor can be varied by selection of the variables PERCENT_ON and MDUTY in the last modulation subroutine 60 described above.

What is claimed is:

1. A control module for a vehicle brake control system, the control system being operable to control the pressure of the brake fluid applied to at least one vehicle wheel brake during an anti-lock braking cycle, the control system including a motor driven pump for supplying pressurized brake fluid to the vehicle brake system, the control module comprising:

a control device adapted to initially supply unmodulated power to the pump motor in the vehicle brake control system at the beginning of the anti-lock braking cycle for a predetermined initial time period; and a vehicle speed sensor coupled to said control device, said speed sensor generating a speed signal, said control device being responsive to said speed signal being less than a predetermined vehicle speed threshold to modulate power supplied to the pump motor at a predetermined constant modulation rate and to maintain said predetermined constant modulation rate during the remainder of the anti-lock braking cycle following said predetermined initial time period.

2. A control module according to claim 1 wherein said control device calculates a vehicle deceleration and is responsive to said vehicle deceleration being less than a predetermined deceleration threshold to modulate said power supplied to the pump motor.

3. A control module according to claim 2 wherein said control device includes a switching device adapted to be connected between a power supply and the pump motor, said switching device having a first conducting state and a second non-conducting state, and further wherein said control device is operable to switch said switching device between said first and second states to modulate said power supplied to the pump motor.

4. A control module according to claim 3 wherein said switching device generates a modulated voltage having a constant duty cycle and an adjustable frequency.

5. A control module according to claim 4 wherein said modulated voltage is switched when the following function is zero:

$$REM(FSCNT/MDUTY);$$

wherein REM is the remainder obtained from the operation shown within the parenthesis;

FSCNT is the value of a system counter which is continuously cycled through a countdown range; and MDUTY is an integer which is selected from a range of integers.

6. A control module according to claim 4 wherein said frequency of said modulated voltage is a function of a vehicle operating parameter.

7. A control module according to claim 3 wherein said switching generates a modulated voltage having a constant frequency and an adjustable duty cycle.

8. A control module for a vehicle brake control system, the control system being operable to control the pressure of the brake fluid applied to at least one vehicle wheel brake, the control system including a motor driven pump for supplying pressurized brake fluid to the vehicle brake system, the control module comprising:

a switching device adapted to be connected between a power supply and the pump motor, said switching device having a first conducting state and a second non-conducting state, a control device coupled to said switching device, said control device operable to switch said switching device between said first and second states to modulate voltage supplied to the pump motor; and a vehicle speed sensor coupled to said control device, said speed sensor generating a speed signal, said control device being responsive to said speed signal being less than a predetermined vehicle speed threshold to actuate said switching device to modulate said voltage supplied to the pump motor, wherein said modulated voltage is switched in accordance with the following relationship:

$$100 * REM(FSCNT/MDUTY) \text{ is less than } MDUTY * PERCENT\_ON$$

wherein REM is the remainder obtained from the operation shown within the parenthesis;

FSCNT is the value of a system counter which is continuously cycled through a countdown range;

MDUTY is an integer which is selected from a range of integers; and

PERCENT_ON is a desired duty cycle for said modulated voltage.

9. A control module according to claim 7 wherein said duty cycle of said modulated voltage is a function of a vehicle operating parameter.

10. A control module according to claim 3 wherein said control device is further operable to begin switching said switching device following the elapse of a predetermined time period.

11. A control module according to claim 10 wherein said control device is included in an anti-lock brake system.

12. A control module according to claim 10 wherein said control device is included in a traction control system.

13. A control module for a vehicle brake control system, the control system being operable to control the pressure of the brake fluid applied to at least one vehicle wheel brake during an anti-lock braking cycle, the control system including a motor driven pump for supplying pressurized brake fluid to the vehicle brake system, the control module comprising:

a control device adapted to initially supply unmodulated power to the pump motor in the vehicle brake control system at the beginning of the anti-lock braking cycle; and a vehicle speed sensor coupled to said control device, said speed sensor generating a speed signal, said control device being responsive to said speed signal to calculate a vehicle deceleration, said control device further being responsive to said vehicle deceleration being less than a predetermined vehicle deceleration threshold to modulate power supplied to the pump motor at a predetermined constant modulation rate and to maintain said predetermined constant modulation rate during the remainder of the anti-lock braking cycle following said predetermined initial time period.

14. A control module according to claim 13 wherein said control device includes a switching device adapted to be connected between a power supply and the pump motor, said switching device having a first conducting state and a second non-conducting state, and further wherein said control device is operable to switch said switching device between said first and second states to modulate said power supplied to the pump motor.

15. A control module according to claim 14 wherein said switching generates a modulated voltage having a constant duty cycle and an adjustable frequency.

16. A control module according to claim 14 wherein said switching generates a modulated voltage having a constant frequency and an adjustable duty cycle.

17. A method for controlling at least one vehicle wheel brake during an anti-lock braking cycle, the method comprising the steps of:

(a) providing a control module for a vehicle brake control system, the control system being operable to control the pressure of the brake fluid applied to at least one vehicle wheel brake during the anti-lock braking cycle, the control system including a motor driven pump for supplying pressurized brake fluid to the brake system, the control module including a control device for supplying power to the pump motor in the vehicle brake control system and a vehicle speed sensor coupled to the control module, the speed sensor generating a speed signal;

(b) supplying initially unmodulated power initially to the pump motor at the beginning of the anti-lock braking cycle;

(c) monitoring the vehicle speed signal and modulating the power supplied to the pump motor at a predetermined constant modulation rate when the vehicle speed is less than a predetermined vehicle speed threshold; and (d) maintaining the predetermined constant modulation rate during the remainder of the anti-lock braking cycle following said predetermined initial time period.

18. A method according to claim 17 further including calculating the vehicle deceleration and modulating the power supplied to the pump motor when the vehicle deceleration is less than a predetermined deceleration threshold.

19. A method according to claim 18 wherein the modulated power has a constant duty cycle and an adjustable frequency.

20. A method according to claim 18 wherein the modulated power has a constant frequency and an adjustable duty cycle.

21. A method according to claim 18 wherein the control device includes a switching device adapted to be connected between a power supply and the pump motor, the switching device having a first conducting state and a second non-conducting state, and further wherein the control device is operable to switch the switching device between the first and second states to modulate the power supplied to the pump motor.

* * * * *